April 22, 1924.

C. JOHNSTON

TIRE CHAIN HOOK

Filed April 23, 1923

1,491,240

WITNESSES

W. A. Williams.

INVENTOR

Charles Johnston

BY Munn & Co.

ATTORNEYS

Patented Apr. 22, 1924.

1,491,240

UNITED STATES PATENT OFFICE.

CHARLES JOHNSTON, OF FRANKFORD, MISSOURI.

TIRE-CHAIN HOOK.

Application filed April 23, 1923. Serial No. 634,077.

*To all whom it may concern:*

Be it known that I, CHARLES JOHNSTON, a citizen of the United States, and a resident of Frankford, in the county of Pike and State of Missouri, have invented certain new and useful Improvements in Tire-Chain Hooks, of which the following is a specification.

This invention relates to a tire chain hook, and has for its object to provide a hook or fastener of this character which may be associated with various types of tire chains and which is capable of securely locking the parts of the chain in assembly on the wheel, the hooks being at the same time of extremely simple construction, readily operable to release the chain to permit the same to be taken from the wheel when desired.

A further object is to provide a device of this character and having these advantages which at the same time is not liable to injure the tire casing or shoe.

A still further object is to provide a device of this character which may be readily manufactured and assembled from materials and by means of facilities ordinarily available and at comparatively slight expense.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1:
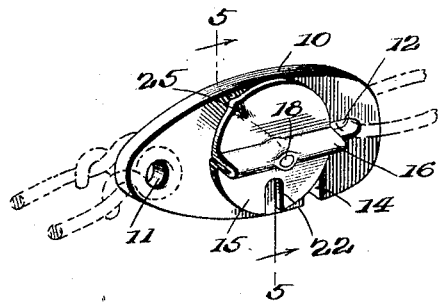
Figure 1 is a perspective view, showing the tire chain hook in locked position.

Referring to the drawings wherein for the sake of illustration is shown the preferred embodiment of the invention, the numeral 10 designates a flat bar somewhat elongated in form and constructed of metal or other suitable material. At one end the bar is apertured, as at 11, whereby it may be properly connected to a link of the tire chain. At its opposite end the bar is provided with an L-shaped slot 12 having a portion 13 extending longitudinally of the bar and providing a seat for a link of the tire chain, the other portion 14 of the slot extending at right angles to the portion 18 and through one side of the bar whereby the link may be entered into the slot.

Figure 2:
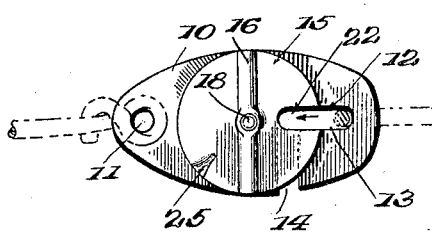
Figure 2 is a view in elevation, illustrating the first step of the chain releasing operation.
Figure 3:
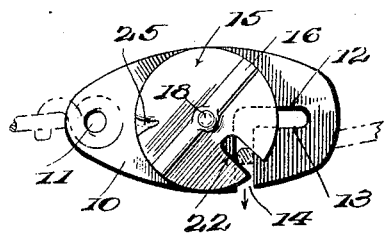
Figure 3 is a similar view showing the second step of the chain releasing operation.
Figure 4:
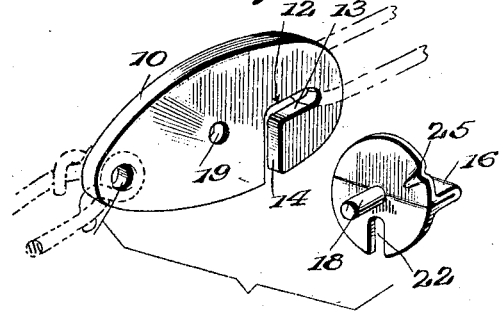
Figure 4 is a group view in perspective, showing the parts of the device prior to assembly.
Figure 5:
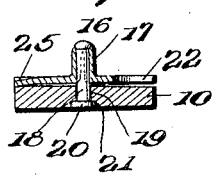
Figure 5 is a view in transverse section on line 5—5 of Figure 1.

A locking plate, designated generally at 15, is provided and comprises a single piece of resilient metal constructed from a blank somewhat elongated in form which is pressed to provide a diametric rib 16 leaving the body of the plate of circular form, as shown in the drawings. The rib 16 is formed of two plies or folds of metal which lie close against each other so as to reinforce and strengthen the locking plate. Centrally the rib 16 is formed to provide a bearing 17. A pivot bolt 18 is provided and extends through an opening 19 formed in the bar 10 and through the bearing 17 of the plate 15, one end of the pivot pin 18 projecting through the upper end of the rib 16 and being headed or swaged over to prevent the pin 18 from falling out of its bearing 17. The opposite end of the pin 18 from that which is connected to the rib 17 is headed, as at 20, and this head 20 operates in a countersink 21 of the opening 19. In this manner the plate 13 is pivotally connected to the bar 10 and it is arranged to overlie the portion 14 of the slot 12 and to some extent the portion 13 thereof whereby it is effective to prevent displacement of the link received in the portion 14 from being displaced from the slot 12. In order to provide for release of the chain the plate 15 has cut or otherwise formed in its periphery a notch 22 which may be alined with the portion 13 of the slot 12, as shown in Figure 2 when it is desired to remove the chain from the hook. With the notch 22 alined with the portion 13 of the slot 12 the link is entered into the notch 22 and the plate 15 is rotated so as to carry the link out through the portion 14 of the bar 10 and clear the bar 10. The manipulation of the plate through these movements is greatly facilitated by the rib 16 which affords convenient means for turning the plate. In order that the plate 15 may not too freely rotate relative to the bar 10 a lug 25 is struck inwardly from the peripheral portion thereof and engages the bar 10 to resiliently and yieldably resist movement of the plate 15 relative to the bar 10.

An important feature of the invention resides in the construction and arrangement of the plate 15 with respect to the bar 10. By forming the rib 16 in the plate a convenient means is provided whereby the plate may be turned and more than this a reinforced and rigid bearing is provided for the pivot pin. This greatly facilitates the assembly of the tire chain with the hook and the taking of the tire chain therefrom since the rib 16 provides a handle for carrying out the necessary manipulations and at the same time provides a strong bearing not liable to become distorted in use so that the device will maintain its capacity for ready operation even when put to the rough usage for which it is intended. The resilient structure of the plate adapts itself to the provision of the resilient lug 25 which prevents too free rotation of the plate.

Also it is to be noted that the portion or leg 13 of the L-shaped slot 12 is so arranged that its center line lies in the longitudinal axis of the bar 10, the portion or leg 14 of the slot extending at right angles to the portion 13. The locking plate 15 has its axis of rotation coincident with the center of the flat bar 10 and of course lying in the longitudinal axis of this bar. Thus it is that when the notch 22 of the plate 15 which extends radially into the plate is alined with the portion 13 of the slot 12 in one of the angular adjustments of the plate 15, as shown in Figure 2 and at this time the leg 14 of the slot 12 extends transversely below the plate 15 and to the point where the notch 22 occurs and parallel to the rib 16. Then as the plate 15 is turned, the end bar of the link of the tire chain having been alined with the portion 14 of the slot 12, the wall of the notch 22 will engage the end bar of the link of the tire chain and will be effective to force the same outwardly through the portion or leg 14 of the slot 12. Moreover with this arrangement the open or outer end of the notch 22 will be alined with the outer end of the portion 14 of the slot 12 at the moment when the end bar of the link of the tire chain is positioned to be discharged from the lug 14 of the slot 12. The novelty of this feature is believed to reside in the arrangement whereby the notch 22 traverses the portion 14 of the slot 12 at a progressively decreasing angle although to some extent depending on the relations above mentioned.

I claim:

1. A tire chain hook comprising a flat bar having one end adapted to be connected to a tire chain and having an L-shaped slot adjacent its opposite end, said slot opening to the side of the bar, a locking plate overlying the portion of the slot opening to the side of the bar and notched at its periphery whereby a link of a tire chain may be entered in the L-shaped slot, and a pivot bolt rotatably connecting the plate and bar.

2. A tire chain hook comprising a bar having a link receiving slot, and a locking plate pivotally connected to the bar and coacting with the slot, said locking plate comprising a single piece of resilient metal having a diametrical rib struck outwardly therefrom to provide a means whereby the plate may be conveniently rotated, the peripheral portion of the plate having a lug struck inwardly therefrom and engaging the bar to hold the plate in adjusted position on the bar.

3. A tire chain hook comprising a bar having a link receiving slot, a locking plate comprising a single piece of resilient metal having a diametrical rib struck outwardly therefrom to provide a means whereby the plate may be conveniently turned, the central portion of said rib being formed to provide a bearing, and a pivot pin extending through the bearing of the rib and connected to the rib, said bar having a countersunk pivot opening through which said pin extends, said pin being headed and the head of the pin operating in the countersink of the bar.

4. A tire chain hook comprising a bar having an L-shaped slot, one leg of the L-shaped slot extending out through the side of the bar and a locking plate pivotally connected to the bar and having a notch in its periphery, said locking plate overlying the L-shaped slot and arranged with respect thereto so that its notch traverses the portion of the L-shaped slot which extends out through the side of the bar at a progressively decreasing angle.

CHARLES JOHNSTON.